Patented Apr. 6, 1954

2,674,610

UNITED STATES PATENT OFFICE 2,674,610

DIHYDROCARBONLEAD DICYANIDES

Hymin Shapiro, Detroit, and Vincent F. Hnizda, Huntington Woods, Mich., and George Calingaert, Geneva, N. Y., assignors to Ethyl Corporation, New York, N. Y., a corporation of Delaware No Drawing. Application February 21, 1951, Serial No. 212,207

2 Claims. (Cl. 260—437)

This invention relates to new organolead compounds and methods for their manufacture. In particular our invention resides in dihydrocarbonlead dicyanides.

A limited number of dialkyllead salts have been previously prepared, the best known of which are the dialkyllead dihalides. These can be conveniently prepared by treating a tetraalkyllead compound with the appropriate halogen under conditions which produce predominantly the dialkyllead dihalide, rather than the trialkyllead halide. These dihalides have little utility and are highly sternutatory solids.

It is an object of our invention to provide a novel class of hydrocarbonlead salts which have utility in themselves. A further object of this invention is to provide a novel class of chemical intermediates, useful in the manufacture of other important lead compounds. Other objects will be apparent from a further description of our invention hereinafter.

The above and other objects of our invention can be achieved by treating dihydrocarbonlead dihalides with metallic cyanides, to produce dihydrocarbonlead dicyanides.

The dihydrocarbonlead dicyanides of our invention comprise the dialkyllead, diaryllead and alkylaryllead dicyanides. In general these organolead dicyanides are prepared by treating an aqueous solution of the corresponding dihydrocarbonlead dihalide with an aqueous solution of a metal cyanide, whereupon the dihydrocarbonlead dicyanide separates as a solid in good yield and high purity and can be recovered by simple filtration. In general we prefer to employ the alkali metal cyanides because of their availability and solubility in the aqueous reaction medium. However, we can employ alkaline earth cyanides and obtain as good results. Where the dihydrocarbonlead dihalide employed as an intermediate is not sufficiently water soluble to permit a one-phase reaction, the aqueous reaction medium can be diluted with alcohol, acetone, or other polar solvents. The products of the reaction are somewhat more soluble in the presence of such solvents, or solvent mixture, and when this embodiment of our invention is employed it is preferred that the product be removed rapidly from the reaction medium and that prolonged contact with the reaction medium at elevated temperatures in particular be avoided.

Typical examples of the dihydrocarbonlead dicyanides of our invention include dimethyl-, diethyl-, dipropyl-, dibutyl-, methylethyl-, methylbutyl-, ethylpropyl-, diphenyl-, methylphenyl-, propylphenyl-, and ditolyl-lead dicyanides. Each of these can be prepared, for example, by treating the corresponding dihydrocarbonlead dichloride with sodium or potassium cyanide. Likewise, each of these can be prepared by treating the corresponding dibromide or diiodide with a metal cyanide.

A typical example of the preparation of one of the compounds of our invention follows, in which all parts and percentages are by weight.

Example

In a reaction vessel provided with an efficient agitator and means for providing an inert atmosphere of nitrogen, a solution of 8.6 parts of potassium cyanide in 750 parts of water was stirred at a temperature of 25° C., while a solution of 21 parts of diethyllead dichloride in 750 parts of water was added over a period of one hour. Throughout the addition a solid product separated which was filtered from the reaction mixture at the end of the addition period, washed with water and dried at a pressure of 100 millimeters of mercury at a temperature of 25° C. This product, diethyllead dicyanide, was 15 parts, corresponding to a yield of 75 per cent based upon the diethyllead dichloride employed. This product was further purified by leaching with refluxing acetonitrile at a pressure of 200 millimeters. The resulting crystalline product contained 65.30 per cent lead and 16.23 per cent cyanide, while the formula $(C_2H_5)_2Pb(CN)_2$ requires 65.29 per cent lead and 16.40 per cent cyanide. This compound decomposes at elevated temperatures but is stable indefinitely at room temperature.

Diethyllead dicyanide was shown to be an effective fungicide in tests wherein the germination of 50 per cent of the spores of each of the fungi *Alternaria oleracea* and *Sclerotinia fructicola* were inhibited by employing an aqueous suspension of diethyllead dicyanide. For this purpose, a suspension of 100 parts of the cyanide in 1000 parts of distilled water, containing a small amount of a commercial dispersant, Triton X-100, was prepared. This standard suspension was tested and further diluted until at a concentration of 10 p. p. m. one-half of the fungi named above were prevented from sporilating as observed in a drop of water on a microscope slide. When the following typical examples of the compounds of our invention are so applied to cultures of these fungi they are also effective at a similar low concentration: methylpropyllead dicyanide, di-n-butyllead dicyanide, methylphenyllead dicyanide, ethylamyllead dicyanide, and ethyltolyllead dicyanide.

The compounds of our invention have further utility as chemical intermediates. For example, when treated at an elevated temperature the dihydrocarbonlead dicyanides decompose to produce a mixture of volatile compounds and a residue of lead dicyanide. This lead dicyanide is uncontaminated with any other ingredients. Thus, we have provided a direct method not heretofore possible for the preparation of this inorganic lead compound in a state of high purity.

Having thus described the compounds of our invention, typical methods for their manufacture and uses to which they can be applied, we do not intend that our invention shall be limited except as claimed herein.

We claim:

1. A process for the manufacture of organolead dicyanides having attached to the lead atom an alkyl group and a group selected from the class consisting of alkyl groups and aryl groups, said process comprising reacting an organolead dihalide having attached to the lead atom an alkyl group and a group selected from the class consisting of alkyl groups and aryl groups with a metal cyanide in aqueous solution and recovering the thereby precipitated diorganolead dicyanide.

2. A process for the preparation of diethyllead dicyanide, comprising reacting diethyllead dichloride with potassium cyanide in aqueous solution and recovering the thereby precipitated diethyllead dicyanide.

References Cited in the file of this patent

Saunders et al., J. Chem. Soc. (1949), pp. 919–922.

Krauss et al., Die Chemie Der Metall. Organischen Verbindugen, p. 402, Edwards Bros. Inc., Ann Arbor, Michigan (1943).

Goddard, Textbook of Inorganic Chem., vol. XI, part I, pp. 347, 309, Charles Griffen & Co. (London), 1928. Also pp. 338, 345.